United States Patent

[11] 3,630,705

| [72] | Inventor | Masaaki Owa<br>Amagasaki-shi, Japan |
|---|---|---|
| [21] | Appl. No. | 825,755 |
| [22] | Filed | May 19, 1969 |
| [45] | Patented | Dec. 28, 1971 |
| [73] | Assignee | Asahi Glass Co., Ltd.<br>Tokyo, Japan |
| [32] | Priority | May 28, 1968 |
| [33] | | Japan |
| [31] | | 43/35730 |

[54] METHOD OF MANUFACTURING FLAT GLASS ON MOLTEN METAL AND APPARATUS THEREFOR
9 Claims, 8 Drawing Figs.

[52] U.S. Cl. ................................................ 65/99 A, 65/32, 65/182 R
[51] Int. Cl. ................................................ C03b 18/00
[50] Field of Search ............................................ 65/99 A, 27, 32, 182

[56] References Cited
UNITED STATES PATENTS
3,467,512   9/1969   Loukes et al. ............. 65/99 A Primary Examiner—Arthur D. Kellogg
Attorney—Kurt Kelman ABSTRACT: In the manufacture of flat glass by the "float process" in which glass is advanced and flattened in ribbon form on a molten metal bath, vibrations of sonic or ultrasonic frequencies are applied to members which are in contact, or may come in contact, with the glass ribbon afloat on the molten metal bath, thereby decreasing the friction between the glass and said members and preventing the glass from sticking to the members.

The aforementioned members include, for example, glass-width regulating members, water-cooled fences, restrictor tiles or/and the sidewall linings of the elongated tank containing said molten metal bath.

PATENTED DEC28 1971 3,630,705

INVENTOR
MASAAKI OWA
BY
AGENT

METHOD OF MANUFACTURING FLAT GLASS ON MOLTEN METAL AND APPARATUS THEREFOR

This invention relates to the manufacture of flat glass and, more particularly, to improvements in the manufacture of flat glass by the method known as the "float process" in which glass form of a ribbon is advanced and in the flattened along a molten metal bath the specific gravity of which is greater than glass.

DESCRIPTION OF THE PRIOR ART

In the manufacture of flat glass by the float process, molten glass at a sufficiently high temperature is continuously fed onto a molten metal bath. The glass is advanced in ribbon from along the bath and flattened. Then as the glass is gradually cooled, a flat glass ribbon with fire-polished surfaces is produced.

The molten metal bath is generally composed of molten tin or a molten tin alloy, which is higher in specific gravity than glass, and is contained in an elongated tank or basin constructed of a refractory material.

In order to prevent oxidation of the molten metal, a plenum of a protective atmosphere, i.e., a nonoxidizing gas such as gaseous nitrogen containing a small proportion of hydrogen, is maintained over said molten metal bath.

In carrying out the production of flat glass by the float process' process hereinbefore described, various troubles are frequently encountered because the edges of the advancing glass ribbon stick to those members of the equipment which are in contact with the glass, such as the sidewalls of the tank, the width-regulating members (fenders) which are located along said sidewalls, or the restrictor tiles located along the sidewalls adjacent the glass-inlet end of said tank for the purpose of limiting the possible spreading of the molten glass layer immediately subsequent to the feeding of the glass into the tank. If the forward movement of the glass ribbon is restricted by any of the aforesaid means, the speed of advance across its width becomes uneven, with the result that the ribbon becomes uneven in thickness or residual stresses of considerable magnitude are induced in the glass ribbon. Furthermore, as a result of the friction, the sidewalls of the tank, width-regulating members or/and restrictor tiles which contact the glass are easily worn and damaged, necessitating more frequent replacement. The width-regulating members which extend along the tank to restrict the lateral flow of the glass to produce a glass plate thicker than the equilibrium thickness (about 6.5mm.) are most often damaged.

SUMMARY OF THE INVENTION

In the manufacture of flat glass by the "float process" in which glass is advanced in the form of a ribbon along a molten metal bath, it is an object of this invention to prevent the glass from sticking to the members of the equipment which contact the glass, such as the sidewalls of the tank, the sidewall linings, width-regulating members, and/or restrictor tiles.

Another object is to obtain a glass ribbon of even thickness in the lateral direction when a glass ribbon thicker than the equilibrium thickness is to be manufactured, by reducing the frictional force that will be operating between the glass and the width-regulating members disposed along the lateral edges of the advancing glass ribbon or layer.

It is still another object of this invention to decrease wear and damage to the members disposed along the edges of the glass ribbon or layer.

Other objects of the invention will become apparent as the following description proceeds.

In the float process, molten glass is fed onto a molten metal bath in a closed elongated tank and allowed to advance in the form of a ribbon along said bath so that it is flattened. The glass ribbon so formed is cooled gradually and withdrawn from said bath. In accordance with the invention, vibrations of sonic or ultrasonic frequencies are applied to the surfaces of the various members which contact the glass ribbon or layer afloat on said molten metal bath. Said members include the restrictor tiles or width-regulating members which are in constant contact with the glass layer or ribbon, the sidewalls of the tank or the liners, such as of graphite, disposed on the inner surfaces of said sidewalls, which, though they are not always exposed to the glass ribbon or layer, may come in contact with said ribbon or layer as the latter rolls, or the water-cooled fences (the U-shaped water-cooled pipes generally referred to as "water fences" ) which are located along the path of the glass ribbon to prevent the ribbon from contacting with the sidewalls.

In this specification, sonic vibrations and ultrasonic vibrations should be construed, for the sake of convenience, as meaning vibrations of frequencies from about 10 cycles to about 16 kilocycles per second and vibrations of frequencies over about 16 kilocycles, respectively, although no distinct demarcation can be made between the two frequency ranges.

The width-regulating members are disposed so that each of the members extends from the point where the glass fed over the molten metal bath has just spread in area to a predetermined width along the side edge of the glass ribbon in the direction of advance of the ribbon to the point where the glass has attained a viscosity at which it no longer spreads in area. The width-regulating member generally has a built-in water-cooling pipe, and is a bar or platelike member constructed of a refractory material which is hardly wettable by glass, preferably graphite or boron nitride.

In accordance with the invention, connecting rods or bars for the transmission of vibrations are attached, in strategical positions, to the width-regulating members, and vibrations are transmitted from a vibration source located outside the tank to the members through those connecting rods. The vibration source may be a device which generates ultrasonic or generate sonic vibrations.

It is preferable that ultrasonic vibrations be used in the high-temperature zone where the viscosity of the glass is comparatively low and that sonic vibrations be applied in the high-viscosity zone, that is to say, in the zone where comparatively low temperatures prevail.

There is no specific restriction on the direction of vibrations, and vibrations may be vertical (up and down), horizontal and in the direction of advance of the glass ribbon (longitudinal), horizontal and perpendicular to the direction of advance of the ribbon (crosswise), or horizontal and elliptical or circular.

The ultrasonic vibrations normally applied to the width-regulating members have frequencies from about 16 to about 250 kilocycles per second and amplitudes of about 1 to 30$\mu$. In the case of sonic vibrations, the frequency is generally about 10 to 400 cycles per second and the amplitude is from 20 to 200 $\mu$.

By the application of such vibrations, adhesion of the glass ribbon to the width-regulating members is prevented substantially completely. Therefore, means for cooling the member, heretofore considered essential, are not required.

In addition, with this invention, as construction material for the width-regulating members, it is possible to employ not only the materials which are not wettable by glass, such as graphite or boron nitride, but also materials which, though wettable by glass, are not vulnerable to molten metal, such as high-alumina refractory, siliceous refractory and other metal oxide refractories as well as sintered alloys.

The invention has hereinbefore been described with particular reference to width-regulating members, but the foregoing is applicable to restrictor tiles as well. It should be understood, however, that since restrictor tiles come in contact with high-temperature glass immediately after it hits the molten metal bath, it is preferably that the vibrations to be applied to the restrictor tiles have, for example, a frequency from 16 to 250 kilocycles/second and an amplitude of 1 to 30$\mu$.

Ultrasonic vibrations are usually applied to the sidewalls of the tank or the linings of those sidewalls, but in the low-temperature zone of the tank, sonic vibrations usually suffice.

Water-cooled fences or any members equivalent thereto are located in the low-temperature zone of the tank and, therefore, sonic vibrations are normally applied to these members.

In carrying the invention into practice, it is possible to construct the width-regulating and other members, or the surfaces of the members which will come in contact with glass, as porous structures and supply a gas, e.g. nitrogen gas, to the interiors of such structures so that the gas is blown out from the contact surfaces to form a film of gas across each surface. In this manner, the lubricating effect between each member and glass can be further enhanced.

This invention will hereinafter be described in detail with reference to the preferred examples illustrated in the accompanying drawings.

Referring to the accompanying drawings which illustrate several preferred examples of the invention, the invention will hereinafter be described and explained in further detail.

Figure 1:
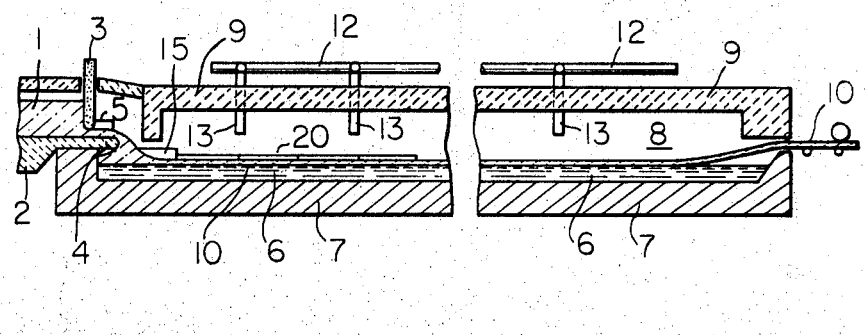
FIG. 1 is a central longitudinal section view showing the equipment embodying the principles of the invention, said equipment including an elongated tank containing a molten metal bath and width-regulating members disposed along the side edges of the glass ribbon.
Figure 2:
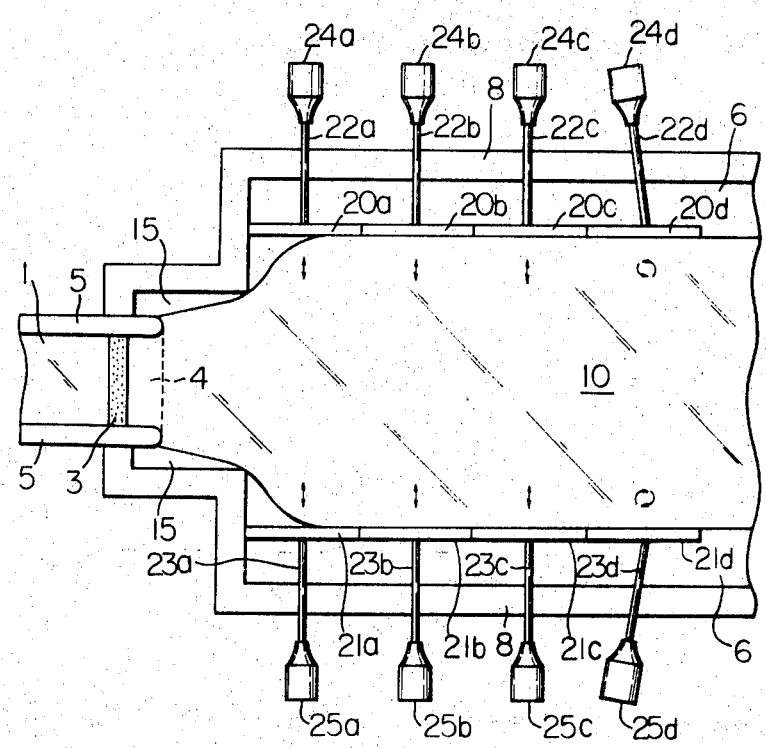
FIG. 2 is a plan view of the interior of the front half of the equipment shown in FIG. 1, showing the manner in which vibrations are applied to the width-regulating members.
Figure 3:
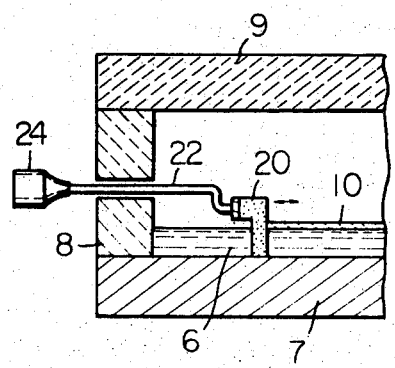
FIG. 3 is a lateral sectional elevation of the equipment illustrated in FIGS. 1 and 2, showing the manner in which vibrations are applied to the width-regulating members.

In FIGS. 1, 2 and 3, molten glass (1) from a glass melting furnace forehearth (2) flows through the channel substantially defined by side jambs (5), the rate of flow of the glass being regulated by a regulating tweel (3), until it is fed, at a lip (4), onto a molten metal bath (6). The molten metal bath (6) is contained in an elongated tank which consists essentially of a bottom structure (7), sidewalls (8) and a roof structure (9), all of which are of refractory construction.

A nonoxidizing gas is passed into the tank from a main pipe (12) through a plurality of branch-pipes (13) extending through the roof structure (9) to maintain a plenum of a protective atmosphere over the metal bath.

The glass fed onto the molten metal bath (6) spreads, between and along restrictor tiles (15) located in the vicinity of the glass inlet end of the tank, so that it assumes a ribbon like configuration. The glass ribbon (10) so formed advances in a layer on the bath until it attains a predetermined thickness. The ribbon (10) is then gradually cooled and, after it has been sufficiently solidified, is withdrawn from the tank at the exit end thereof. Finally, the glass ribbon is generally fed into an annealing lehr (not shown) with the aid of conveying rollers (11).

In the molten metal bath (6), electrical heaters are generally submerged to control the bath at a predetermined temperature gradient. In addition, in the headspace of the tank, heaters and coolers are strategically located so as to assist in the regulation of the temperature of the glass ribbon and of the bath.

On the surface of the molten metal bath in the area partially defined by the restrictor tiles, the glass has a relatively high temperature, e.g. about 1,050° C., and accordingly tends to spread crosswise with respect to the path of its travel.

In this example, this lateral or crosswise flow is restricted by two pairs of width-regulating members which are generally designated by numerals (20) and (21), whereby the glass layer or ribbon is controlled as to its width and thickness.

The width-regulating members (20) and (21) are respectively divided into four individual units, (20a, 20b, 20c, 20d) and (21a 21b, 21c, 21d), all of which are generally bar-shaped members made of a refractory material, e.g., graphite, which is sparingly wettable by the molten metal and glass. Those units are connected to vibration-transmission shafts (22a, 22b, 22c, 22d, 23a, 23b, 23c, 23d respectively, which extend through the sidewalls (8) of the tank. Those transmission shafts, in turn, are connected to vibration sources (24a, 24b, 24c, 24d, 25a, 25c, 25d), respectively.

As the vibration source, use may be made, for example, of an ultrasonic-wave generator equipped with a magnetrostiction oscillator, an electrostriction vibrator or equivalent, or a sonic-wave generator equipped with an electromagnetic vibrator or equivalent.

In the particular working example, best shown in FIGS. 2 and 3, ultrasonic vibrations are applied to three pairs of width-regulating units (20a, 20b, 20 c) and (21a, 21b, 21c, in the lateral direction with respect to the advance of the glass ribbon, as indicated by arrow marks. To the final units (20d, 21d), sonic vibrations are applied. In this instance, the vibrations are applied obliquely so that the units (20d,21d) undergo circular or elliptical motions, imparting forward components of drive forces to the glass ribbon (10).

To the width-regulating units, the ultrasonic-wave generators 24a, 24b, 24c, 25a, 25b, 25c) apply vibrations of the order of 16 kilocycles or more/seconds, e.g. 18 to 25 kilocycles/seconds, in frequency and 1 to 30$\mu$in amplitude. While the glass ribbon (10) has a temperature of about 1,000° C., in the neighborhood of the forward ends of the restrictor tiles (15), the application of said ultrasonic vibrations to the width-regulating particular members prevents adhesion of the glass ribbon to the members and, at the same time, drastically reduces the magnitude of friction between the glass and members, even if the members are not water cooled.

By the time the glass ribbon arrives at the downstream ends of the width-regulating members, its temperature has dropped to about 900° C. to 950° C. It is, therefore, unnecessary to provide ultrasonic vibrations at this point. Instead, vibrations on the order of 50 to 400 cycles/seconds in frequency and 20 to 200$\mu$in amplitude are applied by means of sonic-wave generators. Vibrations on the above order are sufficient to overcome the small frictional force working between the glass and width-regulating members.

Figure 4:
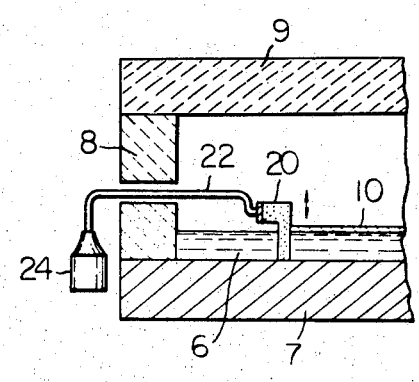
FIG. 4 is a lateral sectional elevation of the equipment, showing another manner in which vibrations are applied to the width-regulating members.

The width-regulating members may be vibrated vertically as shown in FIG. 4. In this instance, the vibration source (20) is connected at right angles to the main shaft of the transmission shafting (22). It is also permissible to apply the vibrations in a horizontal plane and in the direction of advance of the glass ribbon (longitudinal direction).

In the manufacture of a glass plate the thickness of which is in excess of the equilibrium thickness (about 6.5 millimeters) which is determined by the interaction between gravity and the surface tension of the glass-molten metal, the use of width-regulating members of the described type results in a successful prevention of adhesion between the glass and width-regulating members and, simultaneously, a substantial reduction in friction between them.

Furthermore, since it is not essential to cool the width-regulating members in this arrangement, the edges of the glass ribbon will not be excessively cooled. As explained, it is also possible to impart a forward drive to the glass ribbon.

Using the present invention in the above-described manner, it is possible to produce a glass ribbon of uniform thickness and with less distortion and less residual stress than glass produced by the conventional method.

Figure 5:
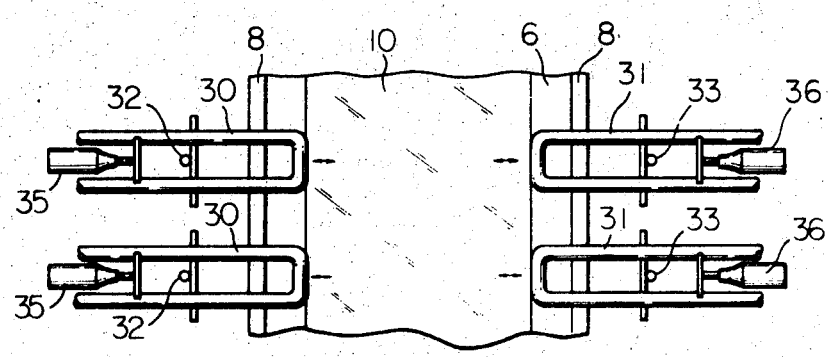
FIGS. 5 and 6 are a plan view and a lateral sectional elevation view, respectively, showing a manner in which vibrations are applied to water-cooled fences.
Figure 6:
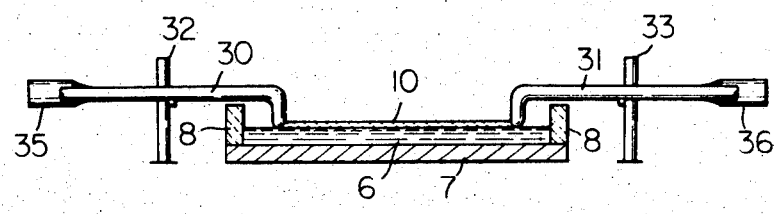

Referring to FIGS. 5 and 6, vibrations are applied to water-cooled fences (30, 31) disposed along the edges of the glass ribbon (10).

The members (30 and 31) are supported by members (32 and 33).

The water-cooled fences are generally disposed in the low-temperature zone of the tank in juxtaposition along the lateral edges of the glass ribbon, and are designed to prevent the glass ribbon from being rocked about and contacting the sidewalls of the tank and retract the glass ribbon by way of convections caused by the cooling effect upon the bath when the ribbon departs therefrom. Thus, the fences serve to maintain the glass ribbon always in a predetermined dynamic position on the molten metal bath.

In this particular example, apparatus (35, 36) capable of generating sonic vibrations e.g., 5 cycles/seconds in frequency and 1 to 100$\mu$ in amplitude) are connected with U-shaped pipes (30, 31) so that vibrations are applied in the crosswise direction with respect to the glass ribbon as indicated by arrow marks.

In the conventional system, the water-cooled fences are damaged by the frictional forces generated on their contact with the glass ribbon, necessitating replacement of the fences every one or two weeks.

This replacement of necessity upsets the sealing of the tank, contaminating the protective atmosphere maintained therein.

In contrast, with this invention, the aforesaid trouble is substantially overcome, and the life expectancy of the water-cooled fences is increased to several weeks. The direction of vibrations of said water-cooled fences is not limited to the lateral direction, but may be longitudinal or vertical with respect to the glass ribbon, or horizontal and oblique so as to cause the fences to undergo circular or elliptical motions, thereby imparting forward drive forces to the glass ribbon.

Figure 7:
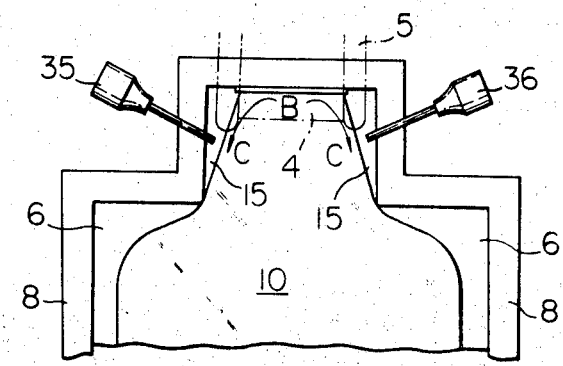
FIG. 7 is a plan view of the equipment, showing a manner in which vibrations are applied to restrictor tiles.

In the working example illustrated in FIG. 7, ultrasonic vibrations (16 kilocycles or more/seconds, 1–30$\mu$ in amplitude) are applied to restrictor tiles (15) disposed in the vicinity of the glass-inlet end of the tank. In this arrangement, the flow of a molten glass layer dripping down the lip (4) onto the bath, then retracting to (B) and advancing toward (C), as indicated by arrow marks, is assisted, with the result that the temperature of the glass at (B) is increased. Therefore, the formation of bubbles in the glass in this zone is reduced. Moreover, since the temperature of the lateral edges of the glass ribbon is increased, the lateral thickness of the ribbon is rendered uniform.

Figure 8:
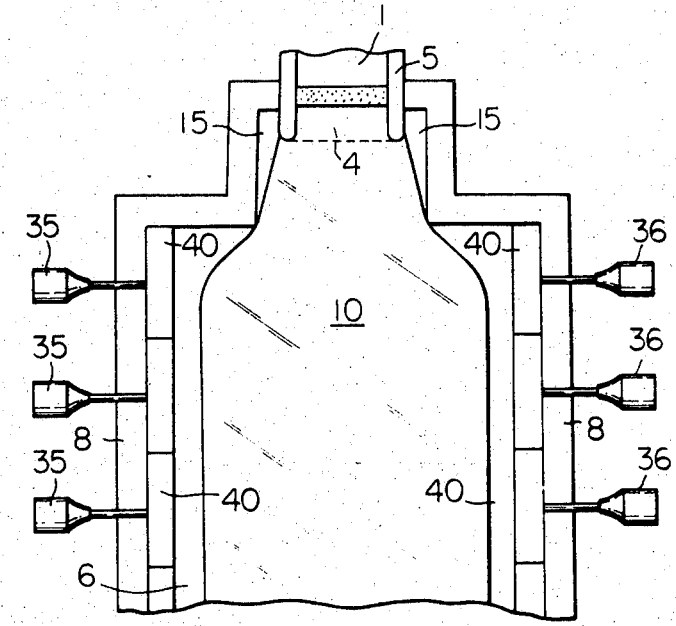
FIG. 8 is a plan view of the equipment, showing a manner in which vibrations are applied to the lining layers of the sidewalls of the equipment.

In the example illustrated in FIG. 8, vibration sources (35, 36) are used to apply ultrasonic vibrations (16 kilocycles or more/seconds in frequency and 1 to 30$\mu$ in amplitude) $\mu$lining layers (40), made of e.g. graphite located on the inner surfaces of the sidewalls (8). In the low-temperature zone of the tank, it is sufficient to use sonic vibrations, as hereinbefore explained.

In this manner, the glass ribbon, when rocking, is prevented from sticking to the lining layers (40).

The examples hereinbefore described with reference to the accompanying drawings are merely illustrative of the invention and many changes and modifications may be made without departing from the spirit and scope of the invention. For instance, vibrations may be applied directly to the sidewalls of the tank, or to any member or members aside from those illustrated and described so as to prevent the sticking of the glass and reduce the friction between glass and such members.

What is claimed is:

1. In the manufacture of flat glass comprising the steps of continuously feeding molten glass onto a molten metal bath advancing the glass in the form of a ribbon along said bath, confining the width of the glass ribbon by a means arranged
for contact with the lateral edges of the advancing glass ribbon, gradually cooling the glass ribbon along said bath, and withdrawing the glass ribbon from the bath, the improvement of applying vibrations to the surfaces of the means in contact with the lateral edges of the advancing glass ribbon.

2. A method according to claim 1, wherein said vibrations are ultrasonic vibrations of the order of 16 to 250 kilocycles per second in frequency and 1 to 30$\mu$ in amplitude.

3. A method according to claim 1, wherein said vibrations are sonic vibrations of the order of 10 to 400 cycles per second in frequency and 20 to 200$\mu$ in amplitude.

4. In an apparatus for the manufacture of flat glass in the form of a ribbon, comprising a substantially sealed elongated tank containing a molten metal bath, means for feeding molten glass onto the bath and for advancing the glass in ribbon form along said bath, means confining the width of the glass ribbon arranged for contact with the lateral edges of the advancing glass ribbon, and means for withdrawing the gradually cooled and solidified glass ribbon from said tank, the improvement comprising a vibration source capable of imparting vibrations to said means in contact with the lateral edges of the glass ribbon.

5. An improved apparatus according to claim 4, wherein said means includes a pair of width-regulating members of a refractory material and disposed in mutually parallel relation in such a manner that they are in contact with the lateral edges of said glass ribbon.

6. An improved apparatus according to claim 4, wherein said means includes restrictor tiles of a refractory material and in contact with the glass immediately subsequent to the feeding thereof onto the molten metal bath.

7. An improved apparatus according to claim 4, wherein said means includes water-cooled fences located along the lateral edges of said glass ribbon.

8. An improved apparatus according to claim 4, wherein said means includes lining layers disposed on the inner surfaces of sidewalls of said tank.

9. An improved apparatus according to claim 5, wherein said width-regulating members are made of a material which is sparingly wettable by glass.

* * * * *